(12) United States Patent
Iriyama et al.

(10) Patent No.: US 8,873,153 B2
(45) Date of Patent: Oct. 28, 2014

(54) CAMERA APPARATUS AND IMAGE PICKUP APPARATUS INCLUDING THE SAME

(75) Inventors: Yutaka Iriyama, Utsunomiya (JP);
Ryuji Ohmuro, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 173 days.

(21) Appl. No.: 13/407,831

(22) Filed: Feb. 29, 2012

(65) Prior Publication Data
US 2012/0224095 A1 Sep. 6, 2012

(30) Foreign Application Priority Data

Mar. 2, 2011 (JP) ................................. 2011-044837

(51) Int. Cl.
*G02B 15/02* (2006.01)
*G02B 7/02* (2006.01)
*G03B 17/00* (2006.01)

(52) U.S. Cl.
USPC ........... 359/672; 359/673; 359/674; 359/675; 359/809; 359/827; 396/73

(58) Field of Classification Search
USPC ............ 359/672–675, 796, 809, 827; 396/72, 396/73, 111, 343, 439, 529
See application file for complete search history.

(56) References Cited

U.S. PATENT DOCUMENTS

| | | | | |
|---|---|---|---|---|
| 4,749,264 A | * | 6/1988 | Taniguchi et al. | 359/673 |
| 4,770,508 A | * | 9/1988 | Yamada et al. | 359/675 |
| 5,349,474 A | * | 9/1994 | Shimizu et al. | 359/675 |
| 2008/0316613 A1 | | 12/2008 | Sakai | |
| 2009/0046199 A1 | | 2/2009 | Nanjo | |

FOREIGN PATENT DOCUMENTS

| | | |
|---|---|---|
| JP | 63025612 A | 2/1988 |
| JP | 2003-322795 A | 11/2003 |
| JP | 2009-042563 A | 2/2009 |
| KR | 10-0930741 B1 | 12/2009 |

OTHER PUBLICATIONS

European Search Report issued in European counterpart application No. EP12001318.0 dated Oct. 24, 2012.
Partial European Search Report issued in counterpart application No. EP12001318.0, dated Jul. 12, 2012.
Korean Office Action for corresponding KR 10-2012-0020083, mail date Apr. 29, 2014. English translation provided.

* cited by examiner

*Primary Examiner* — Evelyn A. Lester
(74) *Attorney, Agent, or Firm* — Rossi, Kimms & McDowell LLP

(57) ABSTRACT

Provided is a camera apparatus including a lens apparatus which is attachable thereto and detachable therefrom, the camera apparatus including: an optical system; and an optical element which is insertable to and removable from an optical path of the optical system, in which: the optical element includes a surface having positive refractive power; and the optical system includes a surface having negative refractive power.

11 Claims, 8 Drawing Sheets

CAMERA APPARATUS AND IMAGE PICKUP APPARATUS INCLUDING THE SAME

BACKGROUND OF THE INVENTION

1. Field of the Invention

The present invention relates to a camera apparatus including an optical system, and more particularly, to a camera apparatus including an optical element which is insertable to and removable from an optical path of the optical system, and an image pickup apparatus including the same.

2. Description of the Related Art

Conventionally, there is known an image pickup apparatus that suppresses a variation of an image forming position due to insertion and removal of an optical element in an optical path by giving refractive power to the optical element to be inserted in the optical path.

For instance, Japanese Patent Application Laid-Open No. S63-025612 discloses an invention of giving refractive power to an optical element to be inserted in order to correct a change of an image forming position when the optical element is inserted. When a flat plate optical element is inserted between an image pickup lens and an image forming surface, or in a lens system of the image pickup lens, the image forming position is shifted to the over side (namely, the opposite side to the object side). In Japanese Patent Application Laid-Open No. S63-025612, positive refractive power is given to the optical element to be inserted so that the movement of the image forming position is canceled.

However, in the conventional technology described in Japanese Patent Application Laid-Open No. S63-025612, insertion and removal of the optical element causes a change in optical characteristic. For instance, if refractive power is given to the optical element to be inserted so as to cancel the shift of the image forming position as described in Japanese Patent Application Laid-Open No. S63-025612, an undercorrected spherical aberration occurs when the optical element is inserted. FIG. 9 illustrates a schematic diagram of the spherical aberration when the shift of the image forming position is canceled as described in Japanese Patent Application Laid-Open No. S63-025612. In FIG. 9, a dashed dotted line 902 indicates aberration when the optical element is not inserted in the optical path, a broken line 901 indicates aberration when the optical element is inserted in the optical path, and a position SA205 is an image pickup surface. Because of this spherical aberration, quality of the obtained image is deteriorated. In addition, best focus positions (903 and 904) that can be expressed as a position where a root mean square (RMS) of a spot diameter of an axial light beam in a spot diagram 901 becomes smallest are not within a focal depth (903). Then, an influence of the insertion and removal of the optical element on the image becomes so conspicuous that the obtained image changes largely.

SUMMARY OF THE INVENTION

Therefore, an image pickup apparatus of the present invention can suppress deterioration of image quality even if a thick optical element is inserted and removed.

In order to achieve the above-mentioned object, according to an exemplary embodiment of the present invention, there is provided a camera apparatus including a lens apparatus which is attachable thereto and detachable therefrom. The camera apparatus includes an optical system and an optical element which is insertable to and removable from an optical path of the optical system. Further, the optical element includes a surface having positive refractive power, and the optical system includes a surface having negative refractive power.

According to an exemplary embodiment of the present invention, it is possible to provide an image pickup apparatus that can suppress deterioration of image quality even if a thick optical element is inserted and removed.

Further features of the present invention will become apparent from the following description of exemplary embodiments with reference to the attached drawings.

DESCRIPTION OF THE EMBODIMENTS

Hereinafter, exemplary embodiments of the present invention are described in detail with reference to the attached drawings.

Figure 1A:
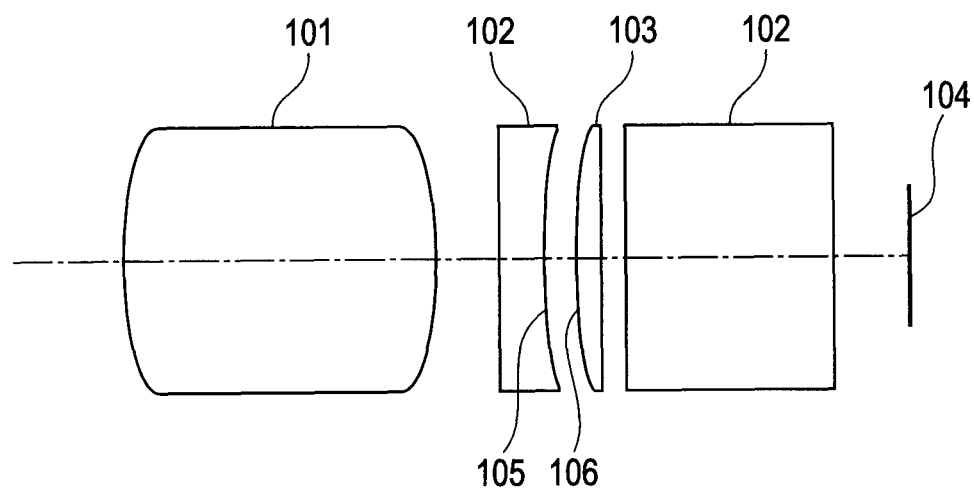
FIG. 1A is a schematic diagram of an optical system structure of a camera apparatus according to an exemplary embodiment of the present invention (in a state in which an optical element is inserted).
Figure 1B:
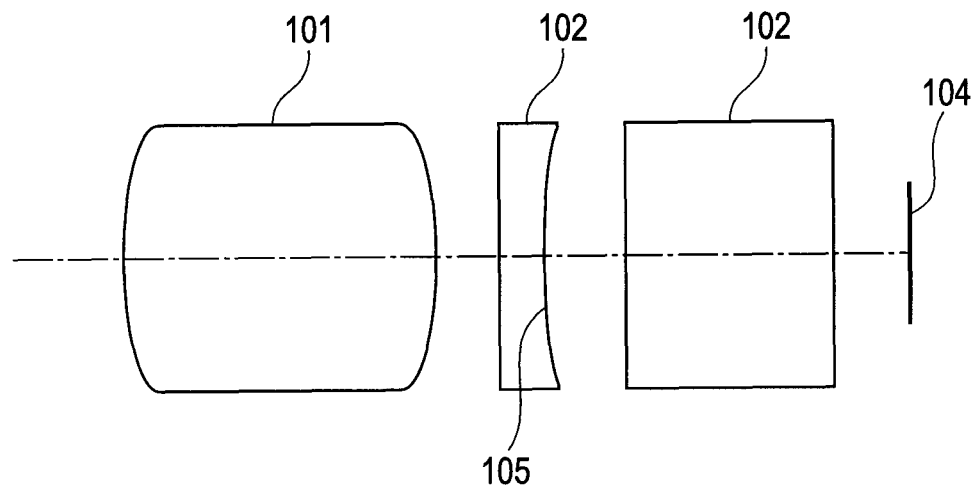
FIG. 1B is a schematic diagram of an optical system structure of the camera apparatus according to the exemplary embodiment of the present invention (in a state in which the optical element is removed).

FIGS. 1A and 1B are schematic diagrams of an optical system structure according to embodiments of the present invention. Here, a camera optical system 102 includes a color separating optical system that splits an image pickup light beam from an object (subject), namely from an image pickup lens into light beams having multiple different colors, and a special effect filter such as an ND filter or a polarization filter. An image pickup lens 101 is attachable to and detachable from a camera apparatus including the camera optical system 102. FIGS. 1A and 1B illustrate an image sensor 104 schematically, but there may be provided multiple image sensors 104 corresponding to the multiple different colors split by the color separating optical system. FIG. 1A illustrates the structure of a state in which an optical element 103 is inserted in the optical path of the optical system including the image sensor 104, and FIG. 1B illustrates the structure of a state in which the optical element 103 is removed. The optical element 103 to be inserted and removed is an optical characteristic conversion filter such as a light reduction filter, a color temperature conversion filter, a cross screen filter, a soft focus filter, or an infrared cut filter. The present invention has a feature that positive refractive power is given to the optical element 103 to be inserted and removed, and the camera optical system fixed on the optical axis has negative refractive power. In FIG. 1A, negative refractive power is given to a surface 105 in the camera optical system, and positive refractive power is given to a surface 106 of the optical element 103 to be inserted and removed. With the positive refractive power given to the optical element 103 to be inserted and removed, a change of the imaging position due to the insertion and removal of the element is suppressed. Further, with the negative refractive power given to the camera optical system 102, an under-corrected spherical aberration that is generated when the optical element 103 is inserted is suppressed.

Figure 2:
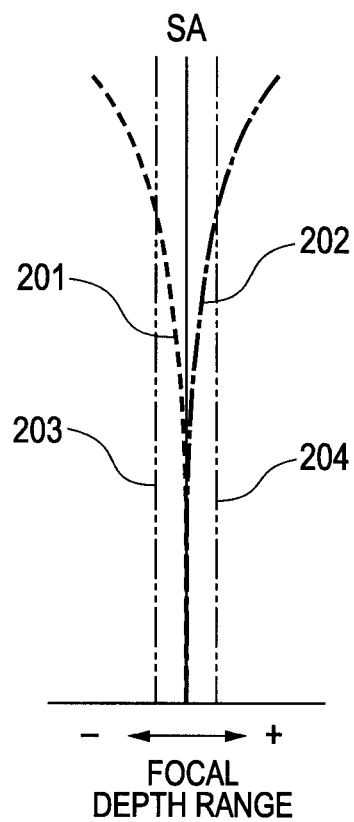
FIG. 2 is a schematic diagram of longitudinal aberration of the camera apparatus according to the exemplary embodiment of the present invention.
Figure 9:
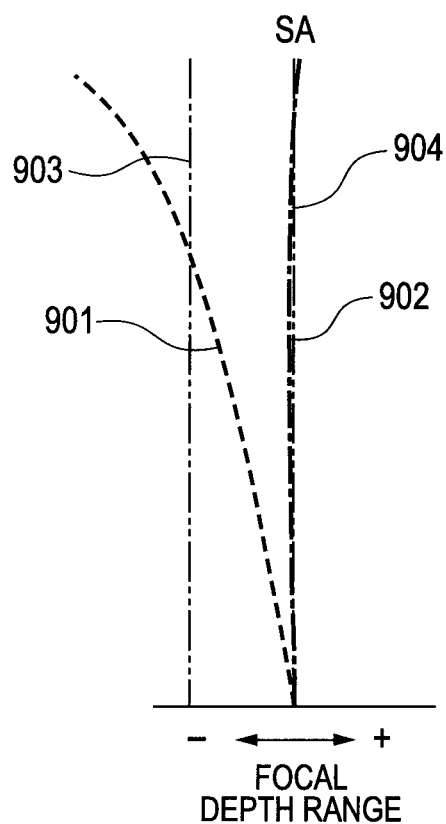
FIG. 9 is a schematic diagram of longitudinal aberration of a conventional example.

FIG. 2 is a schematic diagram of spherical aberration in a case where the same paraxial image position is set when the optical element 103 is inserted in the optical path and when the optical element 103 is removed from the optical path, in the optical structures of FIGS. 1A and 1B. A broken line 201 indicates spherical aberration generated when the optical element 103 is inserted, and a dashed dotted line 202 indicates spherical aberration generated when the optical element 103 is removed. The negative refractive power given to the surface 105 causes over-corrected spherical aberration when the optical element 103 is removed, and hence a change of under-corrected spherical aberration generated when the optical element 103 is inserted can be reduced. Note that, the object side with respect to the image sensor is regarded as the under side, and the opposite direction is regarded as the over side. In addition, a double dot dashed line 203 indicates a best focus position when the optical element 103 is inserted, and a double dot dashed line 204 indicates a best focus position when the optical element 103 is removed. It is preferred to control the best focus position to be within the focal depth. Thus, an influence of a spherical aberration variation on the image can be suppressed. It is clear from comparison with a schematic diagram of conventional spherical aberration illustrated in FIG. 9 that a variation of spherical aberration due to insertion and removal of the optical element can be controlled to be small in the structure of the present invention. Thus, the best focus position can be controlled within the focal depth. Further, through setting of the best focus position on the image pickup surface, a best focused state can be maintained without the insertion and removal of the optical element. Note that, the best focus position is defined as a position at which the root mean square (RMS) of the spot diameter of the axial light beam in the spot diagram becomes smallest.

Figure 3:
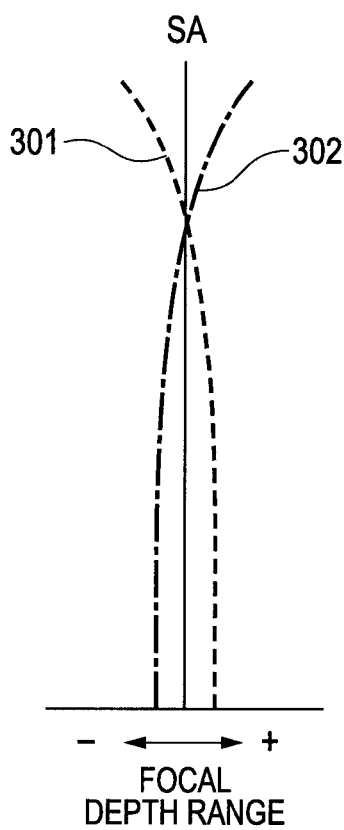
FIG. 3 is a schematic diagram of longitudinal aberration according to the exemplary embodiment of the present invention.

FIG. 3 is a schematic diagram of spherical aberration in a case where the paraxial image position is shifted so that the best focus position is aligned to the image pickup surface in the optical structures of FIGS. 1A and 1B. A broken line 301 indicates spherical aberration generated when the optical element 103 is inserted, and a dashed dotted line 302 indicates spherical aberration generated when the optical element 103 is removed. The spherical aberration generated when the optical element 103 is removed is set to be over-corrected spherical aberration similarly to the case of FIG. 2. However, the paraxial image position is shifted to the under side from the image pickup surface, and the best focus position is aligned to the image pickup surface so that an influence of the spherical aberration on the image when the element is removed is suppressed. In addition, the paraxial image position when the element is inserted is shifted to the over side from the image pickup surface, and the best focus position is aligned to the image pickup surface so that an influence of the spherical aberration on the image when the element is inserted is also suppressed. With this structure, an influence of the insertion and removal of the optical element on the image can be further suppressed. In addition, in general, as a glass element to be inserted and removed has a larger thickness, positive refractive power for suppressing a variation of the image forming position becomes stronger, and a generation amount of the spherical aberration increases. Therefore, deterioration of the image due to the insertion and removal of the optical element is increased. However, in the structure of the present invention, the image pickup surface and the best focus position are aligned in both cases where the optical element is inserted and is removed. Thus, it is possible to relieve restriction of thickness of the optical element to be inserted and removed, without deterioration of the image.

When X denotes a distance between the optical element and the apparent exit pupil, Y denotes a distance between the optical element and the apparent image plane, the image side from a surface of the optical element having positive refractive power is regarded as positive, and the object side from the surface is regarded as negative, aberration can be reduced by reducing a light beam incident angle more by the following structure. That is, if $(X/Y) \geq 0$ is satisfied, or if $(X/Y) < 0$ and $|X| \geq |Y|$ are satisfied, the surface of the optical element having positive refractive power is set to be the surface on the object side, and if $(X/Y) < 0$ and $|X| < |Y|$ are satisfied, the surface of the optical element having positive refractive power is set to be the surface on the image side.

Figure 4A:
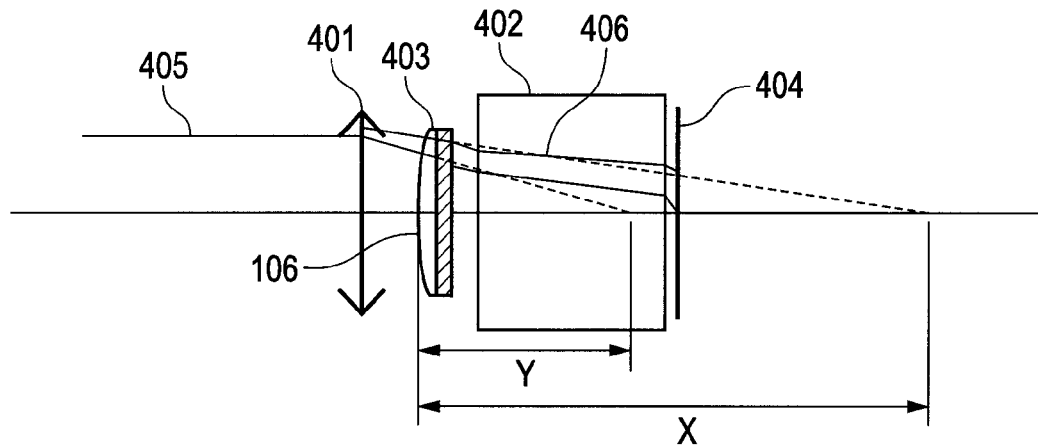
FIGS. 4A, 4B and 4C are schematic diagrams of a relationship between an apparent exit pupil position and an apparent image plane.
Figure 4B:
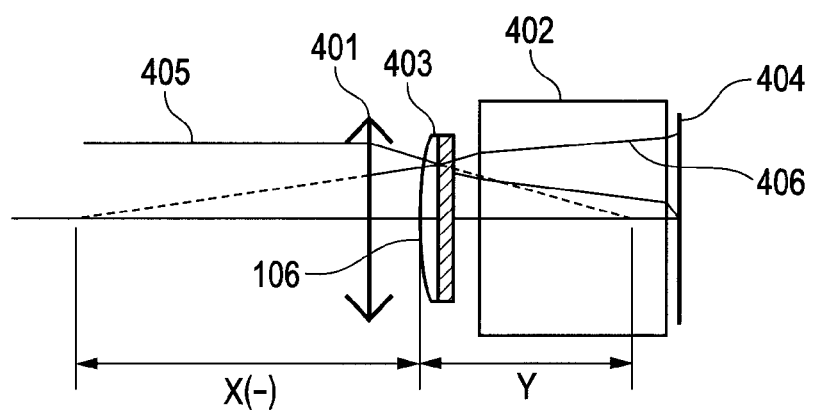
Figure 4C:
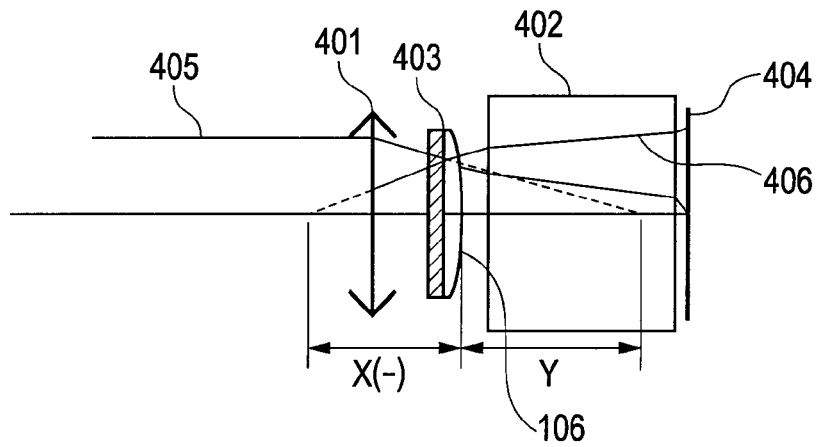

FIGS. 4A to 4C are schematic diagrams illustrating a relationship between a distance X between the surface 106 to which positive refractive power is given and the apparent exit pupil, and a distance Y between the surface 106 and the apparent image plane in the optical system including an image pickup optical system 401, a camera optical system 402 in an image pickup camera, an optical element 403 that can be inserted and removed, and an image pickup surface 404. Note that, FIGS. 4A to 4C illustrate an axial marginal ray 405 and an off-axis principal ray 406. The image side from the surface to which a curvature is given is regarded as positive, and the object side from the surface is regarded as negative.

FIG. 4A illustrates a case where both the apparent image plane and the apparent exit pupil position are disposed on the image side from the optical element. Because $X/Y \geq 0$ is satisfied, the convex surface of the optical element faces the object side. Compared with the case where the convex surface of the optical element faces the image side, the light beam incident angle of each of an axial ray and an off-axial ray becomes small, and hence aberration to be generated can be reduced.

FIG. 4B illustrates a case where both $X/Y < 0$ and $|X| \geq |Y|$ are satisfied. The convex surface of the optical element faces the object side. Compared with the case where the convex surface of the optical element faces the image side, the light beam incident angle of the axial ray can be reduced. Note that, the light beam incident angle becomes a little large for the off-axial ray, but the influence is small because the exit pupil position is sufficiently distant. With this structure, aberration to be generated can be reduced.

FIG. 4C illustrates a case where both $X/Y < 0$ and $|X| < |Y|$ are satisfied. The convex surface of the optical element faces the image side. Compared with the case where the convex surface of the optical element faces the object side, the light beam incident angle of the off-axial ray can be reduced. Note that, the light beam incident angle becomes a little large for the axial ray, but the influence is small because the image plane is sufficiently distant. With this structure, aberration to be generated can be reduced.

If the image pickup apparatus is of lens exchangeable type, those conditions are considered and optimization is performed based on a specification of the lens to be exchanged so that deterioration of the image quality due to insertion and removal of the optical element can be suppressed.

First Embodiment

Hereinafter, referring to FIGS. 5, 6A, and 6B, an image pickup apparatus according to a first embodiment of the present invention is described.

Figure 5:
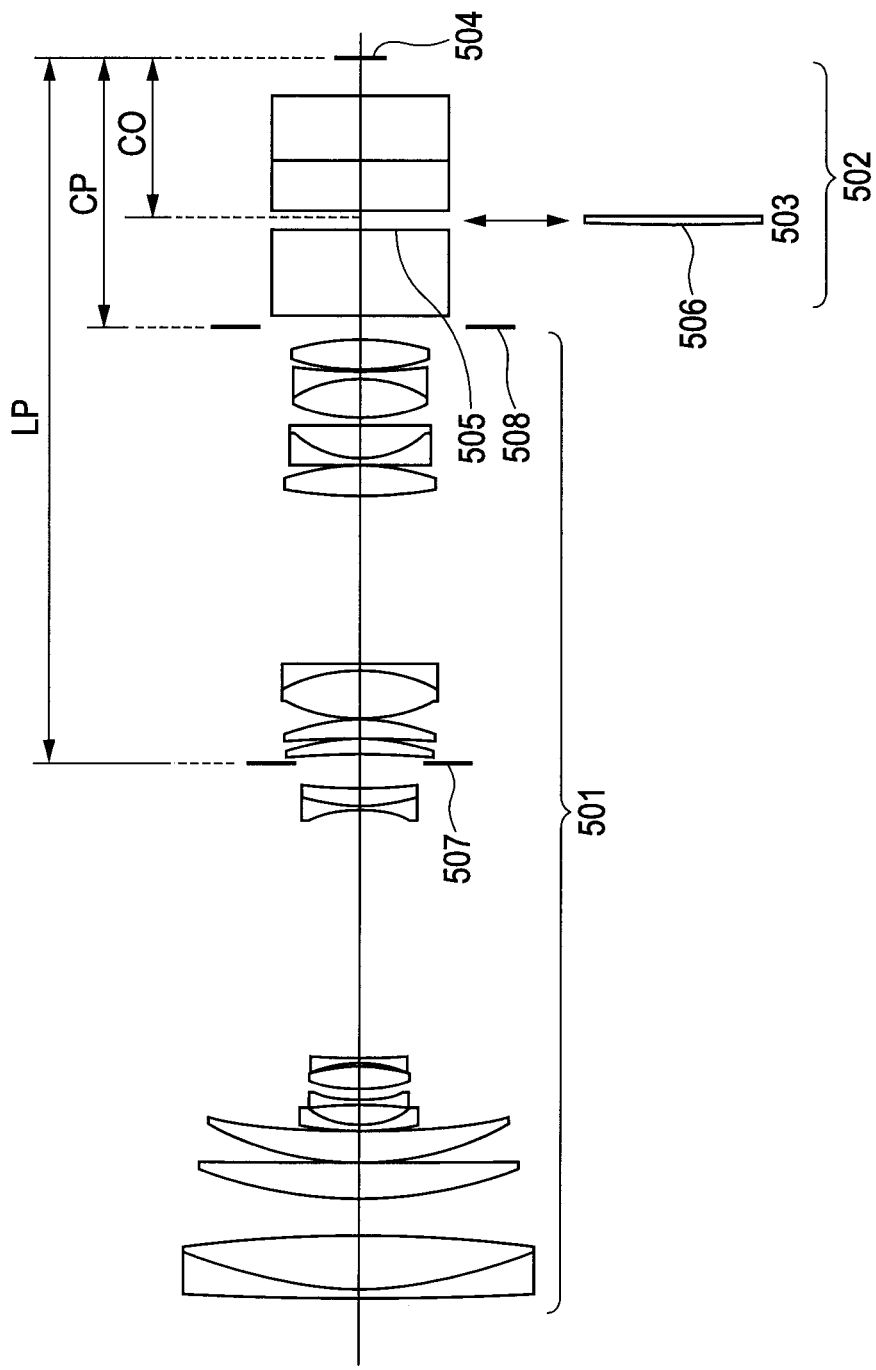
FIG. 5 is a lens cross sectional view of a camera apparatus according to a first embodiment of the present invention.

FIG. 5 is a lens cross sectional view of the first embodiment. On the image pickup surface side of a zoom lens system 501, there is disposed a camera optical system 502 included in the image pickup camera. The zoom lens system 501 includes a stop 507. The camera optical system 502 includes a color separating optical system and an optical characteristic conversion filter such as an ND filter or a CC filter. An optical element 503 that can be inserted and removed is included in the camera optical system. A surface 506 of the optical element 503 on the object side is a convex surface so as to have positive refractive power and is constituted so that the paraxial image position is not changed due to insertion and removal of the optical element 503. In addition, a surface 505, which faces the convex surface 506 of the optical element 503 on the object side when the optical element 503 is inserted in the optical path, is a surface adjacent to the optical element 503 and is a concave surface so as to have negative refractive power. This concave surface suppresses under-corrected spherical aberration when the optical element 503 is inserted and reduces a change of spherical aberration due to insertion and removal of the optical element. With the concave surface formed in a vicinity of the convex surface of the optical element 503, an influence of coma, field curvature, or the like on off-axial aberration is reduced.

In this embodiment, X/Y is 11.4, and the convex surface of the optical element to be inserted and removed faces the object side. In addition, when RA denotes the curvature radius of the surface 506, and RB denotes the curvature radius of the surface 505, |RA/RB|=0.54 is satisfied. If this value is smaller than 0.1, the positive refractive power given to the optical element to be inserted and removed is too strong, and hence over-corrected spherical aberration becomes large. If the value is larger than 0.8, the negative refractive power given to the camera optical system is too strong, and hence under-corrected spherical aberration becomes large.

Figure 6A:
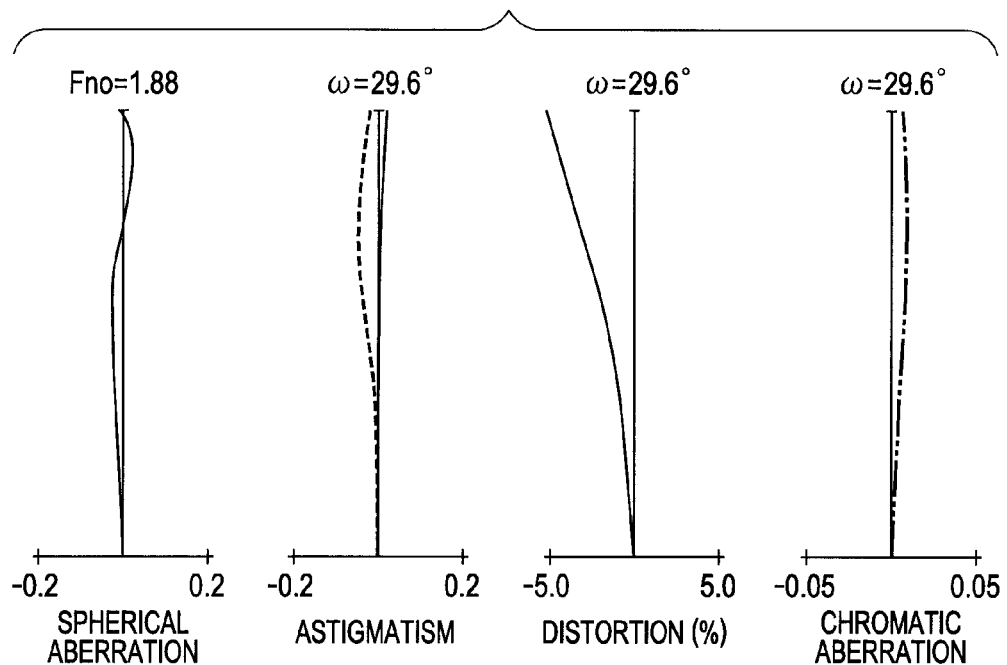
FIG. 6A is a longitudinal aberration diagram of the camera apparatus according to the first embodiment of the present invention when the optical element is removed.

FIG. 6A is a longitudinal aberration diagram when the optical element 503 is removed. A solid line of astigmatism indicates a meridional section, and a broken line thereof indicates a sagittal section. In addition, FIG. 6A illustrates lateral chromatic aberration of g-line. Because the concave surface is formed in the camera optical system, over-corrected spherical aberration is generated. However, because a variation of the best focus position is within the focal depth, an influence on the image is suppressed. In addition, because the paraxial image position is not changed, a variation of the best focus position is decreased by narrowing the stop 507. Therefore, the influence on the image is further reduced.

Figure 6B:
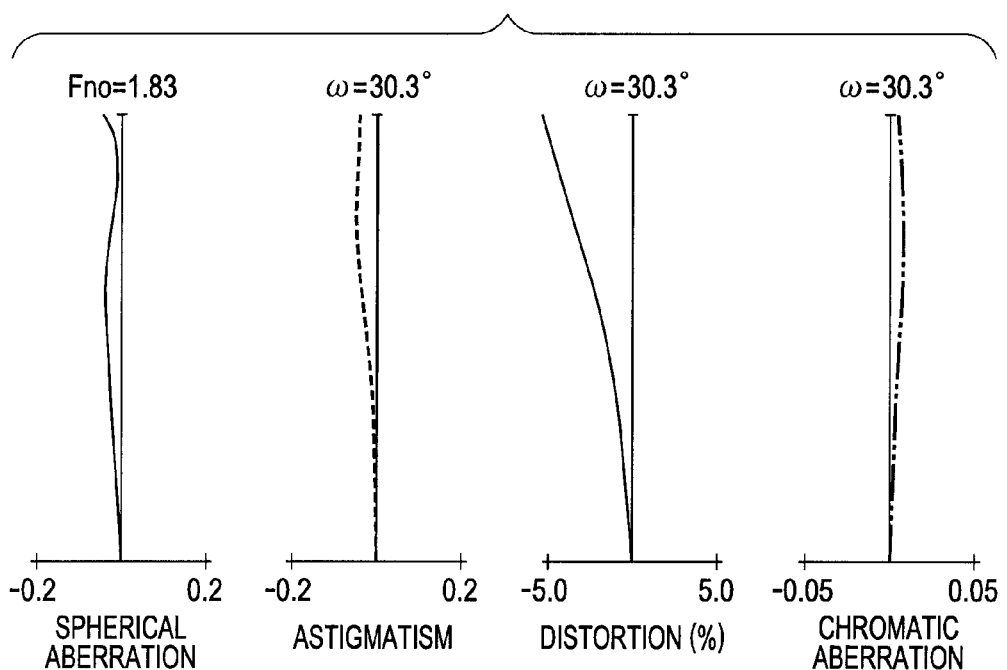
FIG. 6B is a longitudinal aberration diagram of the camera apparatus according to the first embodiment of the present invention when the optical element is inserted.

FIG. 6B is a longitudinal aberration diagram when the optical element 503 is inserted. There is generated under-corrected spherical aberration. However, a variation of the best focus position is within the focal depth owing to the effect of the concave surface in the camera optical system, and hence an influence on the image is suppressed.

In addition, a distance LP between the stop 507 and the image pickup surface of an image sensor 504 in this embodiment is 151.89 mm, and a distance CO between the optical element 503 and the image pickup surface of the image sensor 504 is 36.00 mm. Therefore, CO/LP is 0.24. If CO/LP is 0.1 or smaller, the optical element 503 is inserted and removed at a position where the light beam is more condensed. If dust adheres to the optical element 503 when the optical element 503 is inserted and removed, vignetting of the light beam occurs, and a ghost image of a shade of the dust is apt to occur in the image. In addition, if CO/LP is 0.6 or larger, a diameter of the light beam passing through the optical element 503 increases, and hence spherical aberration generated due to insertion of the optical element 503 is increased. Therefore, it becomes difficult to suppress the best focus position when the optical element 503 is inserted and removed to be within the focal depth.

In addition, a camera mount surface 508 in this embodiment is between a surface of surface number 36 and a surface of surface number 37. A distance CP between the camera mount surface 508 and the image pickup surface of the image sensor 504 is 57.00 mm, and the distance CO between the optical element 503 and the image pickup surface of the image sensor 504 is 36.00 mm. Therefore, CO/CP is 0.63. If CO/CP is 0.4 or smaller, the optical element 503 is inserted and removed at a position where the light beam is more condensed. If dust adheres to the optical element 503 when the optical element 503 is inserted and removed, vignetting of the light beam occurs, and a ghost image of a shade of the dust is apt to occur in the image. In addition, if CO/CP is 0.9 or larger, a diameter of the light beam passing through the optical element 503 increases, and hence spherical aberration generated due to insertion of the optical element 503 is increased. Therefore, it becomes difficult to suppress the best focus position when the optical element 503 is inserted and removed to be within the focal depth.

Note that, this embodiment has exemplified the case where the surface 505, which faces the convex surface 506 of the optical element 503 on the object side when the optical element 503 is inserted in the optical path, is a surface adjacent to the optical element 503 and is a concave surface so as to have negative refractive power. However, the present invention is not limited to this. It should be noted that the effect of the present invention can be obtained even if a surface other than the surface which faces the convex surface 506 of the optical element 503 when the optical element 503 is inserted in the optical path (neighboring surface) is the surface having negative refractive power.

Second Embodiment

Hereinafter, referring to FIGS. 7, 8A, and 8B, an image pickup apparatus according to a second embodiment of the present invention is described.

Figure 7:
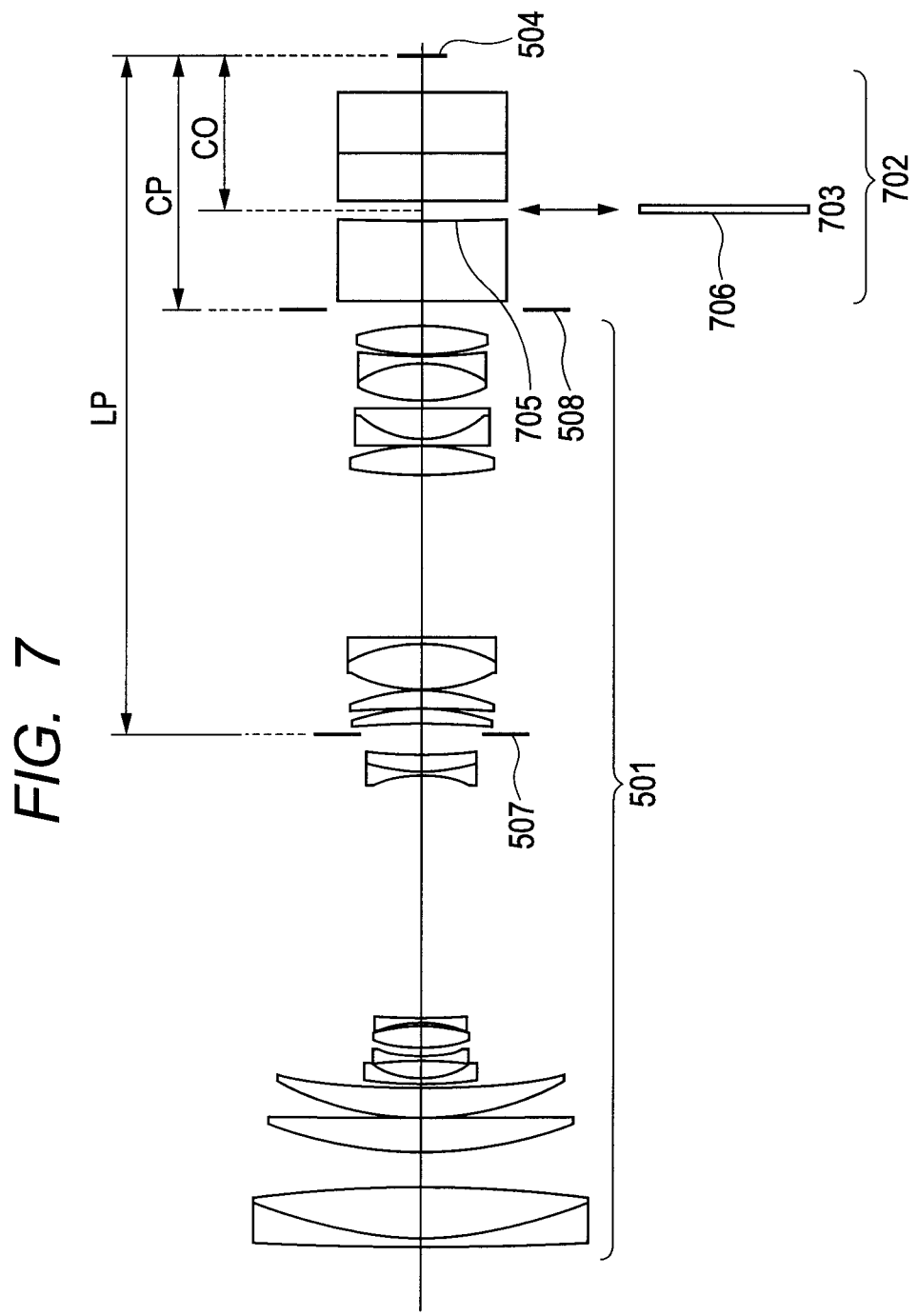
FIG. 7 is a lens cross sectional view of a camera apparatus according to a second embodiment of the present invention.

FIG. 7 is a lens cross sectional view of the second embodiment. On the image pickup surface side of the zoom lens system 501, there is disposed a camera optical system 702 included in the image pickup camera. The camera optical system 702 includes a color separating optical system and an optical characteristic conversion filter such as an ND filter or a CC filter. An optical element 703 that can be inserted and removed is included in the camera optical system. A surface 706 of the optical element 703 on the object side is a convex surface. In this embodiment, the paraxial image position when the optical element 703 is inserted is shifted to the over side from the image pickup surface so that the best focus position when the stop 507 is fully opened is aligned with the image pickup surface. In addition, a surface 705 facing the convex surface 706 of the optical element 703 on the object side is a concave surface. This concave surface suppresses under-corrected spherical aberration when the optical element 703 is inserted and reduces a change of spherical aberration due to insertion and removal of the optical element. Further, the paraxial image position when the optical element is removed is shifted to the under side so that the best focus position when the stop 507 is fully opened is aligned with the image pickup surface.

The best focus position is changed when the stop 507 is narrowed, but because the focal depth becomes deep at the same time, an influence on the image is small.

In this embodiment, X/Y is 11.4, and the convex surface of the optical element to be inserted and removed faces the object side. In addition, when RA denotes the curvature radius of the surface 706, and RB denotes the curvature radius of the surface 705, |RA/RB|=0.54 is satisfied. If this value is smaller than 0.1, the positive refractive power given to the optical element to be inserted and removed is too strong, and hence over-corrected spherical aberration becomes large. If the value is larger than 0.8, the negative refractive power given to the camera optical system is too strong, and hence under-corrected spherical aberration becomes large.

Figure 8A:
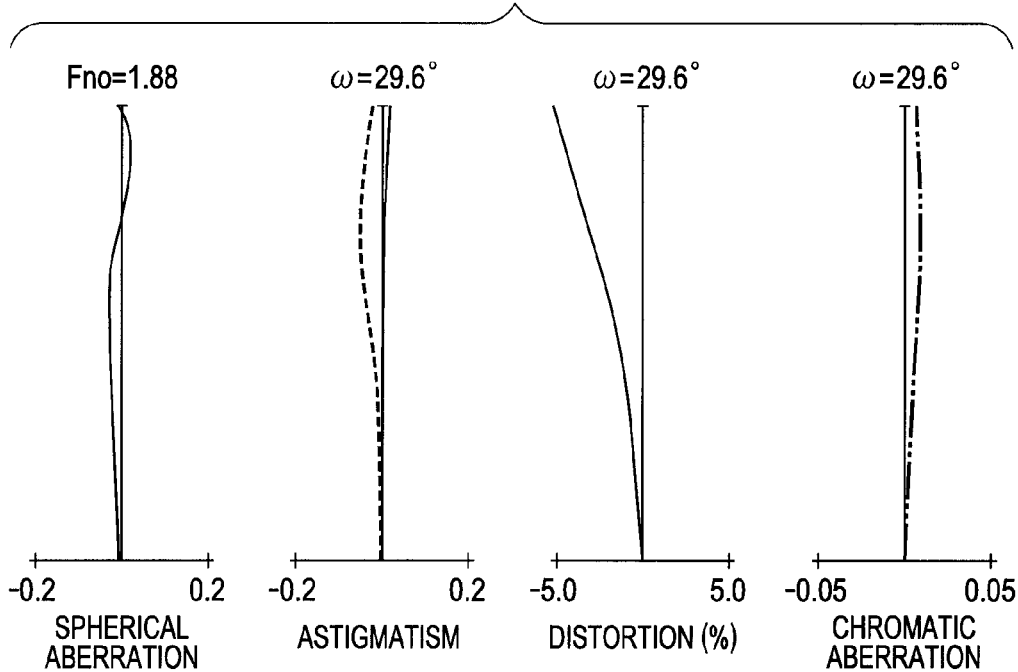
FIG. 8A is a longitudinal aberration diagram of the camera apparatus according to the second embodiment of the present invention when the optical element is removed.

FIG. 8A is a longitudinal aberration diagram when the optical element 703 is removed. Because the concave surface is formed in the camera optical system, over-corrected spherical aberration is generated slightly. However, because the paraxial image position is shifted to the under side from the image pickup surface by 5 μm, an influence on the image is suppressed.

Figure 8B:
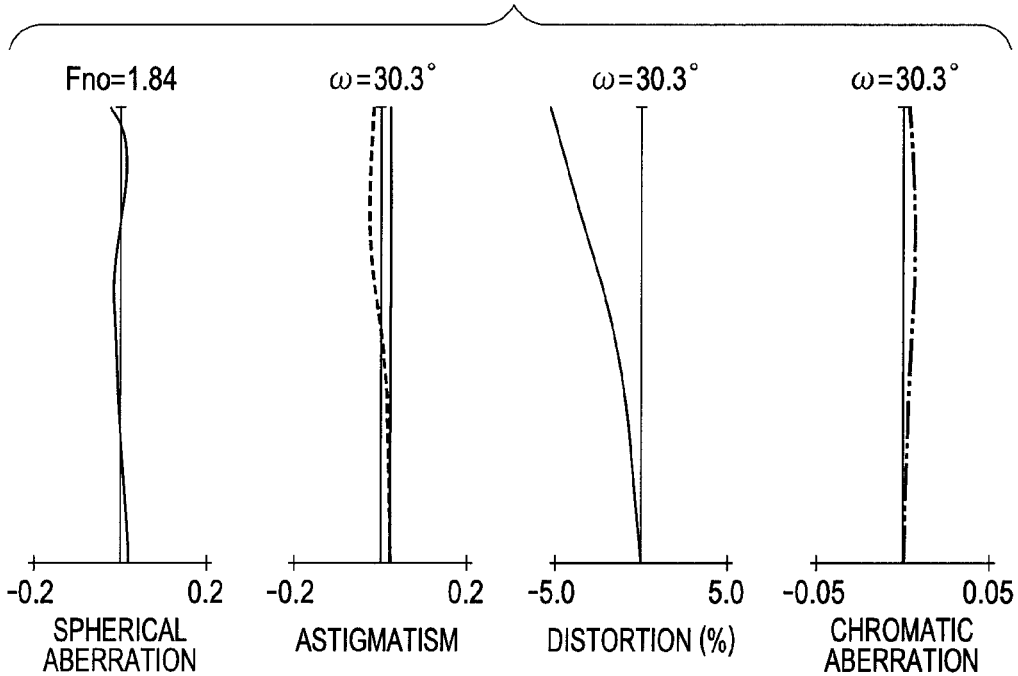
FIG. 8B is a longitudinal aberration diagram of the camera apparatus according to the second embodiment of the present invention when the optical element is inserted.

FIG. 8B is a longitudinal aberration diagram when the optical element 703 is inserted. Although under-corrected spherical aberration is generated, spherical aberration is suppressed by the effect of the concave surface in the camera optical system. Further, the paraxial image position is shifted to the over side from the image pickup surface by 20 μm so that the best focus position is aligned with the image pickup surface. Therefore, an influence on the image is suppressed. A shift amount from the paraxial image position needs to be optimized considering an F-number of the image pickup lens, and axial aberration and off-axial aberration of the entire optical system. For instance, if the F-number is decreased, generated spherical aberration increases. Therefore, a shift amount from the paraxial image position needs to be increased. In other words, through setting of the shift amount appropriately, it is possible to provide an image pickup apparatus having no restriction of thickness of the optical element to be inserted and removed.

In addition, the distance LP between the stop 507 and the image pickup surface of the image sensor 504 in this embodiment is 151.67 mm, and the distance CO between the optical element 703 and the image pickup surface of the image sensor 504 is 35.74 mm. Therefore, CO/LP is 0.24. If CO/LP is 0.1 or smaller, the optical element 703 is inserted and removed at a position where the light beam is more condensed. If dust adheres to the optical element 703 when the optical element 703 is inserted and removed, vignetting of the light beam occurs, and a ghost image of a shade of the dust is apt to occur in the image. In addition, if CO/LP is 0.6 or larger, a diameter of the light beam passing through the optical element 703 increases, and hence spherical aberration generated due to insertion of the optical element 703 is increased. Therefore, it becomes difficult to suppress the best focus position when the optical element 703 is inserted and removed to be within the focal depth.

In addition, a camera mount surface 508 in this embodiment is between a surface of surface number 36 and a surface of surface number 37. The distance CP between the camera mount surface 508 and the image pickup surface of the image sensor 504 is 57.00 mm, and the distance CO between the optical element 703 and the image pickup surface of the image sensor 504 is 36.00 mm. Therefore, CO/CP is 0.63. If CO/CP is 0.4 or smaller, the optical element 703 is inserted and removed at a position where the light beam is more condensed. If dust adheres to the optical element 703 when the optical element 703 is inserted and removed, vignetting of the light beam occurs, and a ghost image of a shade of the dust is apt to occur in the image. In addition, if CO/CP is 0.9 or larger, a diameter of the light beam passing through the optical element 703 increases, and hence spherical aberration generated due to insertion of the optical element 703 is increased. Therefore, it becomes difficult to suppress the best focus position when the optical element 703 is inserted and removed to be within the focal depth.

The embodiment described above has exemplified the case where the surface of the optical element on the object side is a convex surface having positive refractive power, and the surface which faces the convex surface of the optical element on the object side when the optical element is inserted in the optical path is a concave surface having negative refractive power, but the present invention is not limited to this. The effect of the present invention can be obtained also in the structure in which a surface of the optical element to be inserted on the image side is a convex surface having positive refractive power, and the surface which faces the convex surface of the optical element on the image side when the optical element is inserted in the optical path is a concave surface having negative refractive power. Further, it is not necessary to set the concave surface and the convex surface to facing positions, but as described above, with the concave surface formed in a vicinity of the convex surface of the optical element, an influence on off-axial aberration such as coma or field curvature can be reduced, with the result that better optical performance can be secured.

Although the exemplary embodiments of the present invention are described above, the present invention is not limited to those embodiments, which can be modified and changed variously within the scope of the spirit thereof.

Numerical Embodiment 1

Unit: mm

| Surface Number | r | d | nd | vd | Effective diameter |
|---|---|---|---|---|---|
| Surface data (image pickup optical system) | | | | | |
| 1 | 600.261 | 2.20 | 1.75520 | 27.5 | 72.83 |
| 2 | 81.461 | 11.42 | 1.49700 | 81.6 | 69.52 |
| 3 | −290.956 | 7.63 | | | 69.08 |
| 4 | 86.701 | 7.86 | 1.62041 | 60.3 | 65.46 |
| 5 | 3044.710 | 0.15 | | | 64.99 |
| 6 | 66.016 | 6.01 | 1.72916 | 54.7 | 61.52 |
| 7 | 145.708 | (Variable) | | | 60.42 |
| 8 | 111.445 | 0.80 | 1.88300 | 40.8 | 23.69 |
| 9 | 16.812 | 4.65 | | | 20.03 |
| 10 | −47.842 | 0.70 | 1.81600 | 46.6 | 19.80 |
| 11 | 33.779 | 2.24 | | | 19.27 |
| 12 | 28.944 | 5.20 | 1.80518 | 25.4 | 19.72 |
| 13 | −29.192 | 0.54 | | | 19.31 |
| 14 | −24.664 | 0.70 | 1.78800 | 47.4 | 18.93 |
| 15 | 132.572 | (Variable) | | | 18.45 |
| 16 | −28.806 | 0.75 | 1.74320 | 49.3 | 20.25 |
| 17 | 37.218 | 3.81 | 1.84666 | 23.9 | 22.24 |
| 18 | 449.023 | (Variable) | | | 23.13 |

-continued

| | | | | | |
|---|---|---|---|---|---|
| 19 (Stop) | ∞ | 1.80 | | | 27.20 |
| 20 | −231.233 | 3.33 | 1.67003 | 47.2 | 28.33 |
| 21 | −49.133 | 0.20 | | | 29.14 |
| 22 | −170.365 | 4.05 | 1.51742 | 52.4 | 29.94 |
| 23 | −38.625 | 0.20 | | | 30.51 |
| 24 | 36.315 | 10.16 | 1.48749 | 70.2 | 31.27 |
| 25 | −35.564 | 1.66 | 1.83400 | 37.2 | 30.52 |
| 26 | ∞ | 36.00 | | | 30.51 |
| 27 | 97.385 | 6.35 | 1.50137 | 56.4 | 30.32 |
| 28 | −44.438 | 0.20 | | | 30.04 |
| 29 | −535.653 | 1.40 | 1.83400 | 37.2 | 28.54 |
| 30 | 21.016 | 7.22 | 1.50137 | 56.4 | 26.76 |
| 31 | −424.093 | 1.50 | | | 26.79 |
| 32 | 38.505 | 8.29 | 1.51823 | 58.9 | 26.75 |
| 33 | −27.482 | 1.40 | 1.77250 | 49.6 | 26.50 |
| 34 | 91.360 | 0.30 | | | 26.93 |
| 35 | 38.429 | 6.84 | 1.53172 | 48.8 | 27.63 |
| 36 | −52.407 | 5.00 | | | 27.55 |
| Surface data (camera optical system, at time of removing optical element) | | | | | |
| 37 | ∞ | 19.00 | 1.60342 | 38.0 | 36.00 |
| 38 | 991.000 | 1.00 | | | 36.00 |
| 39 | ∞ | 2.00 | | | 36.00 |
| 40 | ∞ | 1.00 | | | 36.00 |
| 41 | ∞ | 11.00 | 1.60342 | 38.0 | 36.00 |
| 42 | ∞ | 14.20 | 1.51633 | 64.2 | 36.00 |
| 43 | ∞ | (Variable) | | | 36.00 |
| Image pickup surface | ∞ | | | | |
| Surface data (camera optical system, at time of inserting optical element) | | | | | |
| 37 | ∞ | 19.00 | 1.60342 | 38.0 | 36.00 |
| 38 | 991.000 | 1.00 | | | 36.00 |
| 39* | 539.090 | 2.00 | 1.51633 | 64.2 | 36.00 |
| 40* | ∞ | 1.00 | | | 36.00 |
| 41 | ∞ | 11.00 | 1.60342 | 38.0 | 36.00 |
| 42 | ∞ | 14.20 | 1.51633 | 64.2 | 36.00 |
| 43 | ∞ | (Variable) | | | 36.00 |
| Image pickup surface | ∞ | | | | |

*Surfaces of 39 and 40 are each an inserting and removing optical element

Various Data
Zoom ratio 19.50

| | | | | | |
|---|---|---|---|---|---|
| Focal length (at time of removing optical element) | 9.66 | 15.46 | 39.52 | 93.05 | 188.43 |
| Focal length (at time of inserting optical element) | 9.42 | 15.07 | 38.52 | 90.70 | 183.66 |
| F-number (at time of removing optical element) | 1.88 | 1.88 | 1.88 | 1.88 | 2.90 |
| F-number (at time of inserting optical element) | 1.83 | 1.83 | 1.83 | 1.83 | 2.83 |
| Angle of field (at time of removing optical element) | 29.65 | 19.58 | 7.92 | 3.38 | 1.67 |
| Angle of field (at time of inserting optical element) | 30.28 | 20.05 | 8.13 | 3.47 | 1.72 |
| Image height | 5.50 | 5.50 | 5.50 | 5.50 | 5.50 |
| Total lens length | 266.06 | 266.06 | 266.06 | 266.06 | 266.06 |
| BF | 7.80 | 7.80 | 7.80 | 7.80 | 7.80 |
| d7 | 0.65 | 15.69 | 35.96 | 46.91 | 52.03 |
| d15 | 53.75 | 36.74 | 13.38 | 3.88 | 6.32 |
| d18 | 5.10 | 7.07 | 10.15 | 8.71 | 1.15 |
| d43 | 7.80 | 7.80 | 7.80 | 7.80 | 7.80 |

Numerical Embodiment 2

Unit: mm

| Surface Number | r | d | nd | vd | Effective diameter |
|---|---|---|---|---|---|
| Surface data (image pickup optical system) | | | | | |
| 1 | 600.261 | 2.20 | 1.75520 | 27.5 | 72.83 |
| 2 | 81.461 | 11.42 | 1.49700 | 81.6 | 69.52 |
| 3 | −290.956 | 7.63 | | | 69.08 |
| 4 | 86.701 | 7.86 | 1.62041 | 60.3 | 65.46 |
| 5 | 3044.710 | 0.15 | | | 64.99 |
| 6 | 66.016 | 6.01 | 1.72916 | 54.7 | 61.52 |
| 7 | 145.708 | (Variable) | | | 60.42 |
| 8 | 111.445 | 0.80 | 1.88300 | 40.8 | 23.69 |
| 9 | 16.812 | 4.65 | | | 20.03 |
| 10 | −47.842 | 0.70 | 1.81600 | 46.6 | 19.80 |
| 11 | 33.779 | 2.24 | | | 19.27 |
| 12 | 28.944 | 5.20 | 1.80518 | 25.4 | 19.72 |
| 13 | −29.192 | 0.54 | | | 19.31 |
| 14 | −24.664 | 0.70 | 1.78800 | 47.4 | 18.93 |
| 15 | 132.572 | (Variable) | | | 18.45 |
| 16 | −28.806 | 0.75 | 1.74320 | 49.3 | 20.25 |
| 17 | 37.218 | 3.81 | 1.84666 | 23.9 | 22.24 |
| 18 | 449.023 | (Variable) | | | 23.13 |
| 19 (Stop) | ∞ | 1.80 | | | 27.20 |
| 20 | −231.233 | 3.33 | 1.67003 | 47.2 | 28.33 |
| 21 | −49.133 | 0.20 | | | 29.14 |
| 22 | −170.365 | 4.05 | 1.51742 | 52.4 | 29.94 |
| 23 | −38.625 | 0.20 | | | 30.51 |
| 24 | 36.315 | 10.16 | 1.48749 | 70.2 | 31.27 |
| 25 | −35.564 | 1.66 | 1.83400 | 37.2 | 30.52 |
| 26 | ∞ | 36.00 | | | 30.51 |
| 27 | 97.385 | 6.35 | 1.50137 | 56.4 | 30.32 |
| 28 | −44.438 | 0.20 | | | 30.04 |
| 29 | −535.653 | 1.40 | 1.83400 | 37.2 | 28.54 |
| 30 | 21.016 | 7.22 | 1.50137 | 56.4 | 26.76 |
| 31 | −424.093 | 1.50 | | | 26.79 |
| 32 | 38.505 | 8.29 | 1.51823 | 58.9 | 26.75 |
| 33 | −27.482 | 1.40 | 1.77250 | 49.6 | 26.50 |
| 34 | 91.360 | 0.30 | | | 26.93 |
| 35 | 38.429 | 6.84 | 1.53172 | 48.8 | 27.63 |
| 36 | −52.407 | 5.00 | | | 27.55 |
| Surface data (camera optical system, at time of removing optical element) | | | | | |
| 37 | ∞ | 19.00 | 1.60342 | 38.0 | 36.00 |
| 38 | 991.000 | 1.00 | | | 36.00 |
| 39 | ∞ | 2.00 | | | 36.00 |
| 40 | ∞ | 1.00 | | | 36.00 |
| 41 | ∞ | 11.00 | 1.60342 | 38.0 | 36.00 |
| 42 | ∞ | 14.20 | 1.51633 | 64.2 | 36.00 |
| 43 | ∞ | (Variable) | | | 36.00 |
| Image pickup surface | ∞ | | | | |
| Surface data (camera optical system, at time of inserting optical element) | | | | | |
| 37 | ∞ | 19.00 | 1.60342 | 38.0 | 36.00 |
| 38 | 991.000 | 1.00 | | | 36.00 |
| 39* | 560.000 | 2.00 | 1.51633 | 64.2 | 36.00 |
| 40* | ∞ | 1.00 | | | 36.00 |
| 41 | ∞ | 11.00 | 1.60342 | 38.0 | 36.00 |
| 42 | ∞ | 14.20 | 1.51633 | 64.2 | 36.00 |
| 43 | ∞ | (Variable) | | | 36.00 |
| Image pickup surface | ∞ | | | | |

*Surfaces of 39 and 40 are each an inserting and removing optical element

Various Data
Zoom ratio 19.50

| | | | | | |
|---|---|---|---|---|---|
| Focal length (at time of removing optical element) | 9.66 | 15.46 | 39.52 | 93.05 | 188.43 |

-continued

|  | | | | | |
|---|---|---|---|---|---|
| Focal length (at time of inserting optical element) | 9.43 | 15.08 | 38.56 | 90.79 | 183.84 |
| F-number (at time of removing optical element) | 1.88 | 1.88 | 1.88 | 1.88 | 2.90 |
| F-number (at time of inserting optical element) | 1.84 | 1.83 | 1.83 | 1.83 | 2.83 |
| Angle of field (at time of removing optical element) | 29.65 | 19.58 | 7.92 | 3.38 | 1.67 |
| Angle of field (at time of inserting optical element) | 30.26 | 20.03 | 8.12 | 3.47 | 1.71 |
| Image height | 5.50 | 5.50 | 5.50 | 5.50 | 5.50 |
| Total lens length | 266.06 | 266.06 | 266.06 | 266.06 | 266.06 |
| BF | 7.80 | 7.80 | 7.80 | 7.80 | 7.80 |
| d7 | 0.65 | 15.69 | 35.96 | 46.91 | 52.03 |
| d15 | 53.75 | 36.74 | 13.38 | 3.88 | 6.32 |
| d18 | 5.10 | 7.07 | 10.15 | 8.71 | 1.15 |
| d43 | 7.80 | 7.80 | 7.80 | 7.80 | 7.80 |

TABLE 1

|  | First embodiment | Second embodiment |
|---|---|---|
| X | 307.3 mm | 307.3 mm |
| Y | 27.0 mm | 27.0 mm |
| X/Y | 11.4 | 11.4 |
| RA/RB | 0.54 | 0.57 |
| LO/LP | 0.24 | 0.24 |
| CO/CP | 0.64 | 0.64 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-044837, filed Mar. 2, 2011, which is hereby incorporated by reference herein in its entirety.

What is claimed is:

1. A camera apparatus to which a lens apparatus is attachable thereto and detachable therefrom, the camera apparatus comprising:
an optical system; and
an insertable/removable optical element that is insertable to and removable from an optical path of the optical system,
wherein the insertable/removable optical element includes a convex surface giving the optical element a positive refractive power,
wherein the optical system includes an optical element having a concave surface giving the optical system a negative refractive power, and
wherein a paraxial image position of the optical system with the insertable/removable optical element removed from the optical path is in a side of the optical system with respect to an image pickup surface of the camera apparatus, and the paraxial image position of the optical system with the insertable/removable optical element inserted in the optical path is in a side opposite to the optical system side with respect to the image pickup surface.

2. A camera apparatus according to claim 1, wherein, when the insertable/removable optical element is inserted in the optical path, the concave surface and the convex surface are adjacent to each other.

3. A camera apparatus according to claim 1, wherein the convex surface faces toward an object side when
(X/Y) ≥0, or
(X/Y) <0, and |X|≥|Y|
is satisfied, and the convex surface faces toward an image side when
(X/Y) <0 and |X|<|Y|
are satisfied,
where X denotes a distance between the convex surface and an apparent exit pupil, Y denotes a distance between the convex surface and an apparent image plane, each distance on the image side with respect to the convex surface is regarded as positive, and each distance on the object side with respect to the convex surface is regarded as negative.

4. A camera apparatus according to claim 1, wherein 0.1<|RA/RB|<0.8 is satisfied, where RA denotes a curvature radius of the surface of the convex surface, and RB denotes a curvature radius of the concave surface.

5. A camera apparatus according to claim 1, wherein the convex surface is convex toward an object side.

6. A camera apparatus according to claim 1, wherein the convex surface is concave toward an image side.

7. A camera apparatus according to claim 1, further comprising:
multiple image sensors corresponding to multiple different colors; and
a color separating optical system that splits a light beam from an object into light beams of the multiple different colors,
wherein the color separating optical system includes the concave surface.

8. A camera apparatus according to claim 1, wherein the concave surface is concave toward an object side, and the convex surface is convex toward an image side.

9. A camera apparatus according to claim 1, wherein 0.4<CO/CP<0.9 is satisfied, where CP denotes a distance between a camera mount surface of the camera apparatus and an image pickup surface of the camera apparatus, and CO denotes a distance between the insertable/removable optical element and the image pickup surface of the camera apparatus.

10. An image pickup apparatus comprising:
a camera apparatus comprising:
an optical system; and
an insertable/removable optical element that is insertable to and removable from an optical path of the optical system,
wherein the insertable/removable optical element includes a convex surface giving the optical element positive refractive power,
wherein the optical system includes an optical element having a concave surface having giving the optical system negative refractive power, and
wherein a paraxial image position of the optical system with the insertable/removable optical element removed from the optical path is in a side of the optical system with respect to an image pickup surface of the camera apparatus, and the paraxial image position of the optical system with the insertable/removable optical element inserted in the optical path is in a side opposite to the optical system side with respect to the image pickup surface; and
a lens apparatus that is attachable to and detachable from the camera apparatus.

11. An image pickup apparatus according to claim 10, wherein 0.1<CO/LP<0.6 is satisfied, where LP denotes a distance between a stop of the lens apparatus and an image pickup surface of the camera apparatus, and CO denotes a distance between the insertable/removable optical element and the image pickup surface.

* * * * *